United States Patent
Sood et al.

(10) Patent No.: US 12,047,391 B2
(45) Date of Patent: Jul. 23, 2024

(54) OPTIMALLY COMPRESSED FEATURE REPRESENTATION DEPLOYMENT FOR AUTOMATED REFRESH IN EVENT DRIVEN LEARNING PARADIGMS

(71) Applicant: PayPal, Inc., San Jose, CA (US)

(72) Inventors: Vishal Sood, Bangalore (IN); Sudhindra Murthy, Bangalore (IN); Ashwin Maruti Hegde, Bangalore (IN); Nitin S. Sharma, San Jose, CA (US); Hong Fan, San Jose, CA (US); Grahame Andrew Jastrebski, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 583 days.

(21) Appl. No.: 17/219,318

(22) Filed: Mar. 31, 2021

(65) Prior Publication Data
US 2022/0321581 A1 Oct. 6, 2022

(51) Int. Cl.
*H04L 9/40* (2022.01)
*G06F 21/55* (2013.01)
*G06N 20/00* (2019.01)
*H04L 67/133* (2022.01)

(52) U.S. Cl.
CPC ........ *H04L 63/1416* (2013.01); *G06F 21/554* (2013.01); *G06N 20/00* (2019.01); *H04L 67/133* (2022.05)

(58) Field of Classification Search
CPC . H04L 63/1416; H04L 67/133; H04L 67/565; G06F 21/554; G06N 20/00; H04W 12/12
See application file for complete search history.

(56) References Cited

U.S. PATENT DOCUMENTS

| | | | | |
|---|---|---|---|---|
| 11,460,982 | B1 * | 10/2022 | Knight | G06F 3/0484 |
| 11,610,094 | B2 * | 3/2023 | Zhang | G06Q 10/1053 |
| 2016/0247080 | A1 * | 8/2016 | Trantham | G06N 3/063 |
| 2018/0060728 | A1 * | 3/2018 | Shan | G06N 5/01 |
| 2018/0219895 | A1 * | 8/2018 | Silver | G06N 3/045 |

(Continued)

OTHER PUBLICATIONS

International Search Report and Written Opinion for Application No. PCT/US2022/020660 mailed on Jul. 8, 2022, 14 pages.

*Primary Examiner* — Farid Homayounmehr
*Assistant Examiner* — Mudasiru K Olaegbe
(74) *Attorney, Agent, or Firm* — Haynes and Boone, LLP (57) ABSTRACT

Systems, methods, and computer program products are directed to machine learning techniques that use a separate embedding layer. This can allow for continuous monitoring of a processing system based on events that are continuously generated. Various events may have corresponding feature data associated with at least one action relating to a processing system. Embedding vectors that correspond to the features are retrieved from an embedding layer that is hosted on a separate physical device or a separate computer system from a computer that hosts the machine learning system. The embedding vectors are processed though the machine learning model, which may then make a determination (e.g. whether or not a particular user action should be allowed). Generic embedding vectors additionally enable the use of a single remote embedding layer for multiple different machine learning models, such as event driven data models.

20 Claims, 4 Drawing Sheets

(56) References Cited

U.S. PATENT DOCUMENTS

| | | | |
|---|---|---|---|
| 2018/0248905 A1* | 8/2018 | Côté | G06N 3/08 |
| 2019/0073580 A1* | 3/2019 | Dzhulgakov | G06N 3/045 |
| 2019/0073590 A1* | 3/2019 | Wu | G06N 3/045 |
| 2019/0260793 A1* | 8/2019 | Stockdale | H04L 63/101 |
| 2021/0374384 A1* | 12/2021 | Munkberg | G06N 3/045 |

* cited by examiner

OPTIMALLY COMPRESSED FEATURE REPRESENTATION DEPLOYMENT FOR AUTOMATED REFRESH IN EVENT DRIVEN LEARNING PARADIGMS

TECHNICAL FIELD

The disclosure generally relates to machine learning models, and more specifically to an embedding layer external to the machine learning models.

BACKGROUND

Machine learning models receive data as input and process the input to determine an output. The output may classify the input into one or more classifications (e.g. analyzing the pixels of a digital image to determine whether or not a human face is present within the picture). To process the input, machine learning models include an embedding layer that transforms or maps the input into embeddings (e.g. embedding vectors). The subsequent layers in the machine learning model encode, decode, and classify the embeddings or embedding vectors.

As machine learning models process different types of input, the size of the embedding layer increases. This is because the machine learning models are trained to map more and more inputs into embeddings and/or embedding vectors, and the more inputs the embedding layer transforms, the more transformations the embedding layer stores, and the larger the embedding layer becomes. Because the embedding layer is included in the machine learning models, the size of the machine learning models increases with the size of the embedding layer. This problem is particularly prevalent in machine learning models that are event driven deep learning (EDDL) models. In EDDL models, the input may be auto-generated during training, and is typically larger than non auto-generated input that may be used to train non-EDDL models. When the input is auto-generated, the size of the input, and hence the embedding layer, increases exponentially. As a result, machine learning models, such as EDDL models, may need to use large amounts of memory space, e.g., hundreds of giga bytes. The increasingly larger sizes of machine learning models create challenges in packaging, deploying, refreshing, storing and executing the machine learning models.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Various embodiments are directed to machine learning models that have an architecture featuring an externally linked embedding layer. The embedding layer is a layer of a machine learning model that maps the data that the machine learning model receives as input to embeddings or embedding vectors. The machine learning model then classifies the input by processing the embeddings or embedding vectors. Notably, according to various embodiments, multiple different machine learning models may share a common external embedding layer (e.g. multiple models that use event-driven data).

To process data, the machine learning model is initially trained on training data. During training, the embedding layer is trained to map the training data to corresponding embeddings or embedding vectors. Because the size of the embedding layer increases with the amount of training data, particularly when the training data is auto-generated (as may occur when training the EDDL models), this disclosure describes an embedding layer that is separate from the machine learning model. Separating the embedding layer is possible because the embedding layer maps the data to embeddings or embeddings vectors. The embedding layer does not typically process and classify the embeddings or embeddings vector as do other layers in the machine learning model.

According to various architectures described herein, the embedding layer may be located externally to the machine learning models. This external location may be in a memory store that is separate from the machine learning models and is conducive for large scale storage. For example, the memory store may be located on a separate server, or storage system, such as a database, from a system that stores the machine learning models. The embedding layer and the machine learning models may be communicatively connected using a remote network connection, wireless connection, or wired connection.

In some embodiments, machine learning models may receive data as input. The input data may be data that is in a processing system and machine learning models may be included in a fraud detection system that identifies fraudulent data, a security breach, or another anomaly in the processing system. When the fraud detection system receives electronic processing requests that include data, the fraud detection system may use an embedding loader to retrieve the embeddings from storage systems. The embedding loader may be located on the same computer, computer system, server, etc., as the machine learning models or may be separate from the computer, computing system, server, etc., but communicatively connected to the machine learning models. The embedding loader may transmit data (such as event data to be interpreted and classified) to the embedding layer stored in the memory store, which as discussed above is in a different computer, computer system, server, etc., from the machine learning models. The embedding layer may map the data to the corresponding embeddings or embedding vectors, and then transmit the embeddings or embedding vectors back to the embedding loader. The embedding loader may then forward the embeddings or embedding vectors to the machine learning model(s) which may process the embeddings or embedding vectors and generate a classification.

The machine learning models may be included in an electronic transaction classification system that assigns one or more categories (of a plurality of categories) to an electronic transaction. Thus, the models may be used in a fraud detection system in one non-limiting embodiment, where an electronic purchase transaction may be classified as fraudulent or legitimate, for example. In this case, the classification may indicate whether or not the data is indicative of a security breach or fraud. If the classification indicates a security breach or fraud, the fraud detection system may issue an alert that indicates that a security breach or fraud occurred in the processing system. In the fraud detection system that uses EDDL models which receive a continuous stream of events, the fraud detection system continuously monitors for security breach or fraud as users interact with a processing system.

Figure 1:
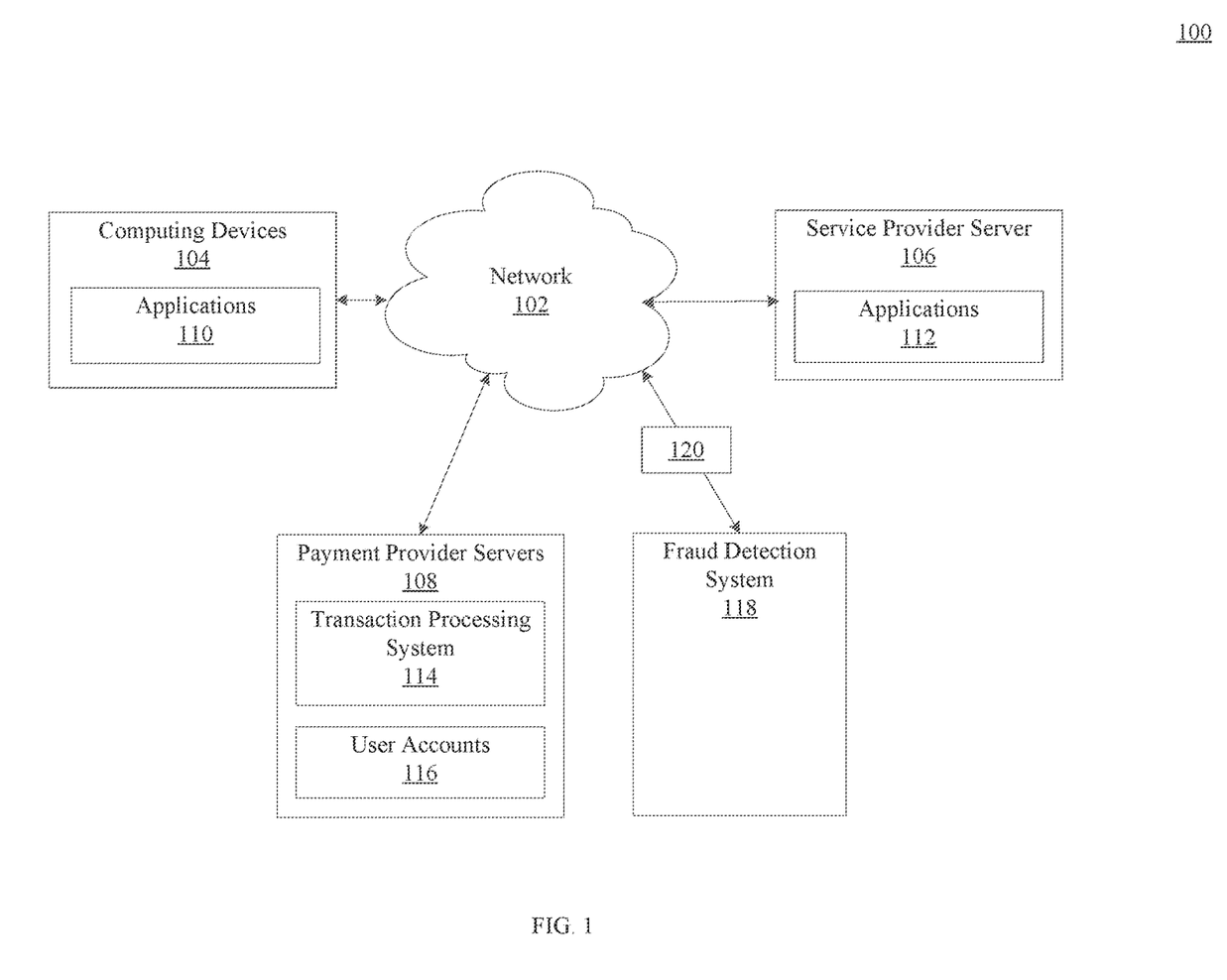
FIG. 1 is an exemplary system where various embodiments can be implemented.

FIG. 1 is an exemplary system 100 where embodiments can be implemented. System 100 may include an example processing system. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small-scale communication network, such as a private or local area network, or a larger scale network, such as a wide area network.

Various components that are accessible to network 102 may be computing device(s) 104, service provider server(s) 106, and payment provider server(s) 108. Computing devices 104 may be portable and non-portable electronic devices under the control of a user and configured to transmit, receive, and manipulate data from service provider server(s) 106 and payment provider server(s) 108 over network 102. Example computing devices 104 include desktop computers, laptop computers, tablets, smartphones, wearable computing devices, eyeglasses that incorporate computing devices, implantable computing devices, etc.

Computing devices 104 may include one or more applications 110. Applications 110 may be pre-installed on the computing devices 104, installed on the computing devices 104 using portable memory storage devices, such as compact disks or thumb-drives, or be downloaded to the computing devices 104 from service provider server(s) 106 and/or payment provider server(s) 108. Applications 110 may execute on computing devices 104 and receive instructions and data from a user, from service provider server(s) 106, and payment provider server(s) 108.

Example applications 110 may be payment transaction applications. Payment transaction applications may be configured to transfer money world-wide, receive payments for goods and services, manage money spending, etc. Further, applications 110 may be under an ownership or control of a payment service provider, such as PAYPAL®, Inc. of San Jose, CA, USA, a telephonic service provider, a social networking service provider, and/or other service providers. Applications 110 may also be analytics applications. Analytics applications perform business logic, provide services, and measure and improve performance of services and functions of other applications that execute on computing devices 104 based on current and historical data. Applications 110 may also be security applications for implementing client-side security features, programmatic client applications for interfacing with appropriate application programming interfaces (APIs) over network 102, communication applications, such as email, texting, voice, and instant messaging applications that allow a user to send and receive emails, calls, texts, and other notifications through network 102, and the like. Applications 110 may be location detection applications, such as a mapping, compass, and/or global positioning system (GPS) applications, social networking applications and/or merchant applications. Additionally, applications 110 may be service applications that permit a user of computing device 104 to receive, request and/or view information for products and/or services and permit the user to purchase the selected products and/or services.

In an embodiment, applications 110 may utilize numerous components included in computing device 104 to receive input, store and display data, and communicate with network 102. Example components are discussed in detail in FIG. 4.

As discussed above, one or more service provider servers 106 may be connected to network 102. Service provider server 106 may also be maintained by a service provider, such as PAYPAL®, a telephonic service provider, social networking service, and/or other service providers. Service provider server 106 may be software that executes on a computing device configured for large scale processing and that provides functionality to other computer programs, such as applications 110 and applications 112 discussed below.

In an embodiment, service provider server 106 may initiate and direct execution of applications 112. Applications 112 may be counterparts to applications 110 executing on computing devices 104 and may process transactions at the requests of applications 110. For example, applications 112 may be financial services applications configured to transfer money world-wide, receive payments for goods and services, manage money spending, etc., that receive message from the financial services applications executing on computing device 104. Applications 112 may be security applications configured to implement client-side security features or programmatic client applications for interfacing with appropriate application programming interfaces (APIs) over network 102. Applications 112 may be communication applications that perform email, texting, voice, and instant messaging functions that allow a user to send and receive emails, calls, texts, and other notifications over network 102. In yet another embodiment, applications 112 may be location detection applications, such as a mapping, compass, and/or GPS applications. In yet another embodiment, applications 112 may also be incorporated into social networking applications and/or merchant applications.

In an embodiment, applications 110 and applications 112 may process transactions on behalf of a user. In some embodiments, to process transactions, applications 110, 112 may request payments for processing the transactions via payment provider server(s) 108. For instance, payment provider server 108 may be a software application that is configured to receive requests from applications 110, 112 that cause the payment provider server 108 to transfer funds of a user using application 110 to service provider associated with application 112. Thus, applications 110 and 112 may receive user data, including user authentication data, for processing any number of electronic transactions, such as through payment provider server 108.

In an embodiment, payment provider servers 108 may be maintained by a payment provider, such as PAYPAL®. Other payment provider servers 108 may be maintained by or include a merchant, financial services provider, credit card provider, bank, and/or other payment provider, which may provide user account services and/or payment services to a user. Although payment provider servers 108 are described as separate from service provider server 106, it is understood that one or more of payment provider servers 108 may include services offered by service provider server 106 and vice versa.

Each payment provider server 108 may include a transaction processing system 114. Transaction processing system 114 may correspond to processes, procedures, and/or applications executable by a hardware processor. In an embodiment, transaction processing system 114 may be configured to receive information from one or more applications 110 executing on computing devices 104 and/or applications 112 executing on service provider server 106 for processing and completion of financial transactions. Financial transactions may include financial information corresponding to user debit/credit card information, checking account information, a user account (e.g., payment account with a payment provider server 108), or other payment information. Transaction processing system 114 may complete the financial transaction for the purchase request by providing payment to application 112 executing on service provider server 106.

Payment provider server 108 may also include user accounts 116. Each user account 116 may be established by one or more users using applications 110 with payment provider server 108 to facilitate payment for goods and/or services offered by applications 112. User accounts 116 may include user information, such as name, address, birthdate, payment/funding information, travel information, additional user financial information, and/or other desired user data. In a further embodiment, user accounts 116 may be stored in a database or another memory storage described in detail in FIG. 4.

In some embodiments, computing devices 104 that execute applications 110, payment providers servers 108, and applications 112 that execute on server provider servers 106, and the connection of these components over network 102 may constitute a processing system. A user may use application 110 of computing device 104 to interact with the processing system. For example, a user may enter user credentials into a graphical user interface that may be displayed on application 110 and log-in or access the processing system via application 110. Next, the user may use application 110 to perform actions, such as browse products or services available on application 110, select one or more products or services, and/or purchase the selected one or more products or services. In some embodiments, an action may correspond to an event that may be logged in application 110 or elsewhere in the processing system. An event may include data or features associated with the event, such as user log-in information, products or services browsed or stored, purchase information, whether a purchase transaction has been initiated or completed, etc.

Accordingly, for an electronic transaction service, a user may generate a great number of different events during the course of interacting with that service. These events can be as simple as moving a mouse cursor or a rate at which keys are pressed on a keyboard. They can include any action taken on a user computing device, and/or sub-components of that action. Events may include particular user interface actions with a hardware user interface (mouse, touchpad, keyboard, touchscreen, fingerprint sensor, microphone, etc.), or a system response to those actions. Events may also include application level events, such as navigating to a particular web page within a web browser, or a particular display section in an app installed on a mobile phone device. Events may include service level events, such as performing a login using a user ID and security credentials, checking an account balance, sending or receiving money, etc. As will be appreciated by one of skill in the art, what a user thinks of as "one action" such as logging into their PayPal™ account may correspond to many different "events" that can be fed into a machine learning model. The totality of these events may be used to determine if a particular electronic transaction (transfer of money, logging into an account, etc.) is fraudulent or indicates a potential security breach. Events may also correspond to actions taken or caused to be taken on a server system as well.

Thus, the more a user interacts with the processing system, the more events, and hence the more features the user generates. Initially, the features may include user credentials and user account information after the user logs into application 110. As the user browses the application 110, the features may include different products or services selected by the user, different products or services purchased by the user, etc.

System 100 may also include a fraud detection system 118. Fraud detection system 118 may identify a fraud event or security breach that may occur in system 100. Example fraud events or security breaches may occur when one user uses another user's account, payment information, etc., without authorization to perform transactions. Another example of fraud events or security breaches occur when one user creates a user account with another user's credentials, payment information, etc. Unlike conventional fraud detection systems that detect fraud when a user accesses an application, fraud detection system 118 may detect fraud or security breaches in real-time as the user interacts with the processing system.

To identify fraud or security breaches in real-time, the processing system may transmit an event stream 120 to fraud detection system 118. Event stream 120 may include features that are generated in real-time based on actions or events that occur in the processing system as a result of a user interacting with applications 110, payment provider servers 108 and/or service provider server 106. Event stream 120 may be continuously transmitted to fraud detection system 118 or in response to one or more actions or events. In some embodiments, the processing system may issue an electronic processing request that includes portions of the event stream 120 with the features. In response to receiving the event stream 120 or the electronic processing request, fraud detection system 118 may determine whether fraud or a security breach appears to be occurring or appears to have occurred in the processing system. The process may continue throughout the user's interaction with the processing system. In this way, fraud detection system 118 may continuously determine whether fraud or a security breach is occurring in system 100 (e.g. multiple different assessments may be made as a user logs in to her account, checks an account balance, changes a mailing address, and transmits money from the account to another destination, etc.).

Thus, unlike conventional systems where a breach may be identified merely when the user initially attempts to log into application 110, fraud detection system 118 may identify a security breach at multiple (e.g. continuous, event based,) different points in time. Notably, the more the user interacts with the processing system, the more event-based features may be generated, and the more accurately fraud detection system 118 may identify fraud or a security breach. In other words, because fraud detection system 118 receives a continuous event stream 120 that includes features identifying how the user interacts with the processing system, fraud detection system 118 may more accurately determine whether a security breached is occurring at various points in time. In other words, as a user interacts with application 110, e.g., by entering log-in information, browsing the content of application 110, selecting items or services into a shopping cart, purchasing the selected items or services, entering payment information, etc., the processing system generates more and more features. As the features are generated, the features are transmitted to fraud detection system 118 as part of event stream 120 either continuously or in response to a particular action. Based on the features in event stream 120, fraud detection system 118 may identify fraud or a breach that occurs in the processing system.

Figure 2:
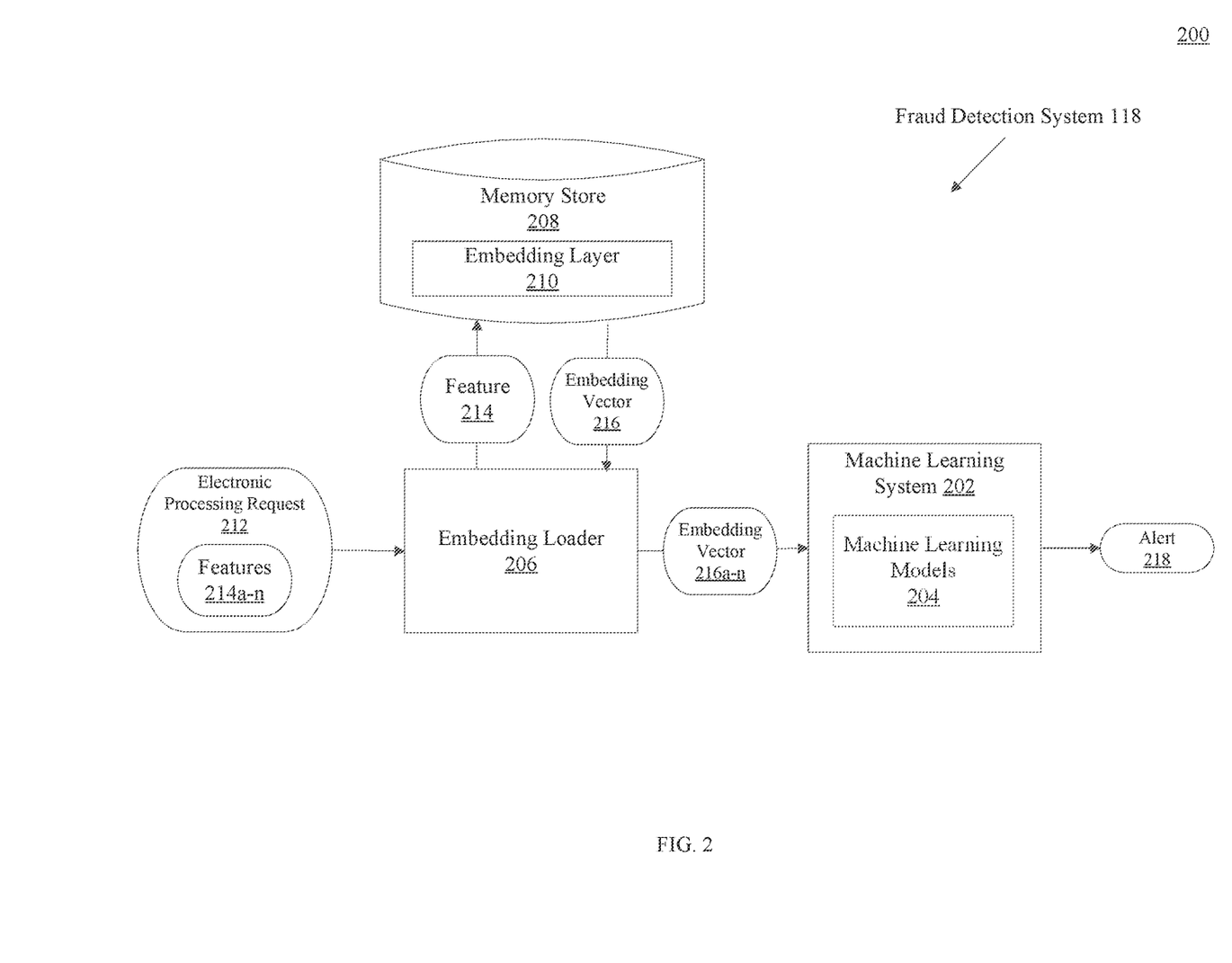
FIG. 2 illustrates components of a fraud detection system, according to an embodiment.

FIG. 2 is a block diagram 200 of a fraud detection system, according to some embodiments. Fraud detection system 118 includes a machine learning system 202. Machine learning system 202 includes one or more machine learning models 204. Fraud detection system 118 also include an embedding loader 206, and a memory store 208 that stores an embedding layer 210.

Machine learning models 204 may be trained to detect fraud based on features. Each machine learning model 204 may receive different features, or as discussed below, embeddings or embedding vectors that correspond to different features, and process the embedding vectors to identify fraud. For example, the embedding vectors may be transformed by multiple layers of the machining learning model 204. These layers may include at least layers associated with an encoder that encodes the embeddings into encodings, layers that are associated with a decoder that receives the encodings and decodes the encodings, and a classifier that receives the output of the decoder as input and classifies the input as fraudulent or non-fraudulent. Notably, each machine learning model 204 may be trained differently to classify fraud based on different features and may receive different embeddings that correspond to different features in event stream 120.

In some embodiments, machine learning models 204 may be event driven deep learning (EDDL) models. The EDDL models may receive an event stream, such as event stream 120 or portions of event stream 120 as input and identify fraud by processing the embedding vectors from the event stream 120.

Machine learning models 204 may be associated with embedding layer 210. Embedding layer 210 converts features in event stream 120 into corresponding embedding vectors before the embedding vectors are processed by the machine learning model 204. For example, embedding layer 210 may map or transform a feature, such as account number, Internet protocol (IP) address, VID (virtual local area network (LAN) identifier), etc., into an embedding vector. The size of the embedding vectors may be different for different features. Embedding vector may include one or more numbers that correspond to the size of the embedding vector. The numbers may be positive numbers, negative numbers, integers, floats, etc. Further, each feature may have thousands of different values, and each value may be mapped to its own corresponding embedding vector. Because embedding layer 210 may transform millions of features into embedding vectors, embedding layer 210 may be large, such as several giga-bytes in size.

In conventional machine learning models, the embedding layer is included as part of each machine learning model. This contributes to the conventional machine learning models' large size. The problem is further exacerbated in conventional EDDL models. This is because, unlike non-EDDL models that are trained on a dataset that includes existing features, i.e., features that were previously generated by the processing system or features that were manually generated, the features for EDDL models are auto-generated during training. When features are auto-generated during training, the number of features may be exponentially higher than the number of features used to train non-EDDL models. Because features are converted into embedding vectors for both EDDL and non-EDDL models, the embedding layer that converts the features into embeddings for EDDL models may be exponentially larger in size than the embedding layer for non-EDDL models. This can result in the EDDL models that include the embedding layer being several giga-bytes or larger in size.

Unlike conventional machine learning models, the machine learning models 204 in FIG. 2 do not include an embedding layer. This reduces the size of machine learning models 204 by several giga-bytes (or even hundreds of gigabytes), and contributes to faster model versioning, packaging, deployment, and production adjudication of machine learning models 204, which uses less computing resources for those modeling operations. As illustrated in FIG. 2, fraud detection system 118 includes memory store 208. Memory store 208 may be non-volatile memory, database, etc., that is conducive for large data storage and retrieval. Other memory storage types may also be used, however (e.g. a large store of volatile memory/RAM). Memory store 208 may be substantially larger than memory that stores machine learning system 202 and machine learning models 204 (not shown). For example, while memory store 208 may be a non-volatile large-scale storage memory, memory that stores machine learning system 202 may be a significantly smaller random-access memory.

Memory store 208 is a separate memory store from machine learning system 202 and machine learning models 204 according to various embodiments. That is, memory store 208 may be on a separate computer device, computer server, computer system, physical location, etc., that the computer device or system that stores and/or executes the machine learning system 202. Further, memory store 208 may be communicatively connected to machine learning system 202 and/or machine learning models 204 using a wired or wireless network connection. In some embodiments, the network connection may be a remote network data connection.

Memory store 208 may include embedding layer 210. Some or all machine learning models 204 may use embedding layer 210. As discussed above, embedding layer 210 may map or transform features into embedding vectors. There may be one embedding vector for each value of each feature. Further, embedding vectors may have different sizes for different features. For example, an embedding vector that corresponds to an account feature may have a different size from an embedding vector that corresponds to an IP feature. The embedding vector may serve as input to one or more machine learning models 204. Memory store 208 may store embedding layer 210 because embedding layer 210 may have a larger size than the memory used to store machine learning models 204.

Fraud detection system 118 may include an embedding loader 206. Embedding loader 206 may be located on the same or different computing device as machine learning system 202. Embedding loader 206 may receive an electronic processing request 212. Electronic processing request 212 may include features in event stream 120 or a portion of features in event stream 120 discussed in FIG. 1. Event stream 120 includes features that corresponds to streamlined events that occur in the processing system. Once received, embedding loader 206 may parse and retrieve the features 214*a-n* included in electronic processing request 212. For each feature in features 214a-n, embedding loader 206 may retrieve a corresponding embedding vector from embedding layer 210. For example, as illustrated in FIG. 2, embedding loader 206 may transmit a feature 214 (or a feature identifier and a value of the feature) to embedding layer 210. In another example, embedding loader 206 may transmit multiple features 214a-n to embedding layer. To transmit feature 214 (or features 214a-n), embedding loader by use a remote network data connection, a database connection (e.g., open database connectivity (ODBC), a Java database connectivity (JDBC), a structured query language (SQL), a database server connection, etc.), a TCP/IP connection, an HTTP connection, a fiber connection, an ethernet connection, a wireless connection (e.g. a point-to-point (P2P, a T-1, an OC3, a DSL, a cable, a fiber, or a satellite connection), etc. In some embodiments, embedding loader 206 may use a corresponding network interface device that established one of the connections described above with memory store 208 to make a remote network call. The remote network call may that include feature(s) 214. In another example, embedding loader 206 and memory store 208 may share an application programing interface (API), such that a portion of the API is located within embedding loader 206 and another portion within memory store 208. The embedding loader 206 may use the API to issue a request that includes features(s) 214 to memory store 208. Notably, the above examples are for example purposes only, and other types of network connections and requests to transmit feature(s) 214 from embedding loader 206 to memory store 208 may be used.

Embedding layer 210 may generate a corresponding embedding vector 216 for feature 214 or features 214a-n and transmit embedding vector 216 or embedding vectors 216a-n back to embedding loader 206. For example, for each feature 214 and a corresponding value of each feature 214, embedding layer 210 may store a corresponding embedding vector 216. Once the embedding vector 216 or vectors 216a-n are generated, the embedding vector 216 or vectors 216a-n may be transmitted back over a network to embedding loader 206. For example, if embedding loader 206 made a remote network request, the embedding vector 216 or vectors 216a-n may be transmitted back to embedding loader 206 using a remote network response. In another example, if memory store 208 includes an API, the embedding vector 216 or vectors 216a-n may be transmitted to embedding loader 206 using the API.

Once embedding loader 206 receives embedding vector 216 that corresponds to feature 214 or embedding vectors 216a-n that correspond to features 214a-n, embedding loader 206 may forward embedding vectors 216a-n to machine learning system 202.

Once machine learning system 202 receives embedding vectors 216a-n, one or more machine learning models 204 may process embedding vectors 216a-n or a subset of embedding vectors 216a-n to determine whether the features 214a-n are associated with fraud. In one example, one of machine learning models 204 may process embedding vectors 216a-d and another one of machine learning models 204 may process embedding vectors 215e-n. In another example, the first and second machine learning models 204 may process embedding vectors 216a-g, while a third machine learning model 204 may process embedding vectors 216h-n. In yet another embodiment, each of machine learning models 204 may process embedding vectors 216a-n. Notably, different machine learning models 204 may process the same or different sets or subsets of embedding vectors 216a-n, and the examples above are for illustrative purposes only. If one or more machine learning models 204 classifies embedding vectors 216a-n or a subset of embedding vectors 216a-n as indicative of anomaly (i.e. an anomalous event, impermissible user action, etc.), fraud, or security breach, machine learning system 202 may generate an indication that corresponds to an anomaly, fraud, or security breach, such as an alert 218. Processing an embedding vector by a machine learning model may therefore include, in various embodiments, using values in the vector to make a classification and/or create a model score that corresponds to the embedded values (e.g. determining if a set of event-driven data is indicative of a transaction fraud, an unauthorized use of a user account, or some other determination/score).

Machine learning system 202 may generate alert 218 when one of machine learning systems 204 identifies a security breach or fraud. Machine learning system 202 may also aggregate indicators from different machine learning systems 204 and include the aggregate indicators into alert 218. For example, if one machine learning model 204 generates an indication while a second machine learning model 204 does not generate an indication, alert 218 may include the indication from the first model. In another example, if one machine learning model 204 generates an indication and the second machine learning model 204 generates an indication, alert 218 may include a combined indication that indicates that fraud has occurred, or multiple indications that also indicate the machine learning model 204 that generated the indication.

In some embodiments, embedding loader 206 may receive multiple electronic processing requests 212 as a user interacts with the processing system in system 100. For example, embedding loader 206 may receive electronic processing requests 212 as different actions or events occurring within the processing system. Example events may occur when the user logs into application 110 of FIG. 1, browses through different products or services, at checkout, at payment, etc. At each of these multiple events, embedding loader 206 may receive electronic processing requests 212 that include different features 214 and different values in features 214, that are then converted to different embedding vectors 216 and processed by machine learning models 204 in machine learning system 202. Machine learning system 202 may generate alert 218 for any one of electronic processing requests 212 if one or more machine learning models 204 identifies fraud.

In some embodiments, separating embedding layer 210 from machine learning models 204 has several benefits. First, the size of machine learning models 204 may be reduced by several giga-bytes (indeed, dozens or even several hundred gigabytes in some embodiments). In one example, conventional machine learning models that were trained on approximately 170 million features, used approximately 650 MB of memory. When the conventional machine learning models were converted to machine learning models 204 by removing the embedding layers and storing the embedding layers as embedding layer 210, the size of machine learning models 204 decreased to 41 MB.

Second, embedding layer 210 may be stored in memory store 208 that is conducive for large data storage and retrieval, which may not be the case with conventional machine learning models.

Third, the same embedding layer 210 may be used for multiple machine learning models 204, which eliminates a data overlap where multiple embedding layers in conventional machine learning models 204 transform the same feature into the same embedding vector. Further, embedding vectors 216 generated for a particular machine learning model 204 may be reused by other machine learning models

204. This may improve accuracy of the machine learning models 204. This also saves memory space, because each machine learning model 204 may use a corresponding, and in some cases, the same embedding vector 216 for feature 214 as is the case with conventional machine learning models. Unlike conventional machine learning models that individually convert the feature 214 to embedding vector 216, multiple machine learning models 204 may receive the embedding vector 216 for the same feature 214 from the embedding layer 210. Also, generic embedding vectors 216 can be trained during the machine learning model training process. These generate embedding vectors 216 may be used across different machine learning models 204, such as machine learning models 204 that detect an anomaly during a user login event, transaction processing or purchase event, transaction withdrawal event, etc. Accordingly, in one embodiment, a particular embedding layer 210 might be set up to service a first machine learning model by converting a set of feature values into an embedding vector 216 so that the first model can reach a decision on those features (e.g. the first model determines whether an electronic transaction appear to be fraudulent). The same embedding layer 210 may also be used to service a second machine learning model that performs a different task, but uses some or all of the same event-driven data features, by converting a different set of feature values into another embedding vector 216. E.g. the second model may determine whether an attempt by a user to login to a user account, or to change some data of the user account (such as an email address, mailing address, funding source, etc.) is representative of a security breach of the user account/unauthorized use of the user account. In this manner the embedding layer 210 may be used to flexibly support multiple different machine learning models, which is not possible when the embedding layer is specifically integrated into each model itself, as in other machine architecture types. Various embodiments herein discussing embedding vectors and/or an embedding vector 216 therefore may be used with generic embedding vectors (e.g. embedding vectors that are configured to support multiple different machine learning models).

Fourth, as the processing system in FIG. 1 evolves and grows, the processing system may include new features that may be mapped to new embedding vectors. For example, a new user may be registered with a new user account in user accounts 116 in system 100, and new embedding vectors may be needed for the new user account, new user credentials, etc. While in conventional machine learning models, the embedding layer included in the models may be updated to e.g., map the new user account to the new embedding vector by retraining the conventional machine learning models, in fraud detection system 118, embedding layer 210 may be updated or refreshed without retraining machine learning models 204. For example, the mappings between new features 214 and embedding vectors 216 that correspond to the new user, new user account, etc., may be added to embedding layer 210. In this way, when embedding layer 210 receives the new features 214, the embedding layer 210 may be able to convert the new features 214 to the corresponding embedding vectors 216. Notably, because embedding layer 210 is separate from the machine learning models 204, only the embedding layer 210 is refreshed. The machine learning models 204 themselves are not refreshed or retrained to learn the mapping between the new feature 214 and corresponding embedding vectors 216. This is particularly advantageous as it may allow those machine learning models to be re-used without having to re-train them which is a computationally expensive and time-consuming process.

Notably the architectures described herein may be used for any type of machine learning model, particularly larger event driven models, in various embodiments. While examples are given herein relating to transaction classification (e.g. if an electronic transaction represents fraud and/or an account security breach), many other types of machine learning models can benefit from separating the embedding layer from the underlying model, especially when the embedding layer may be large in size. Further, although the indication in the embodiments above indicates whether fraud or security breach is occurring in processing system, the indication may also be a classification of the event from different types of events that occurs in the processing system.

Figure 3:
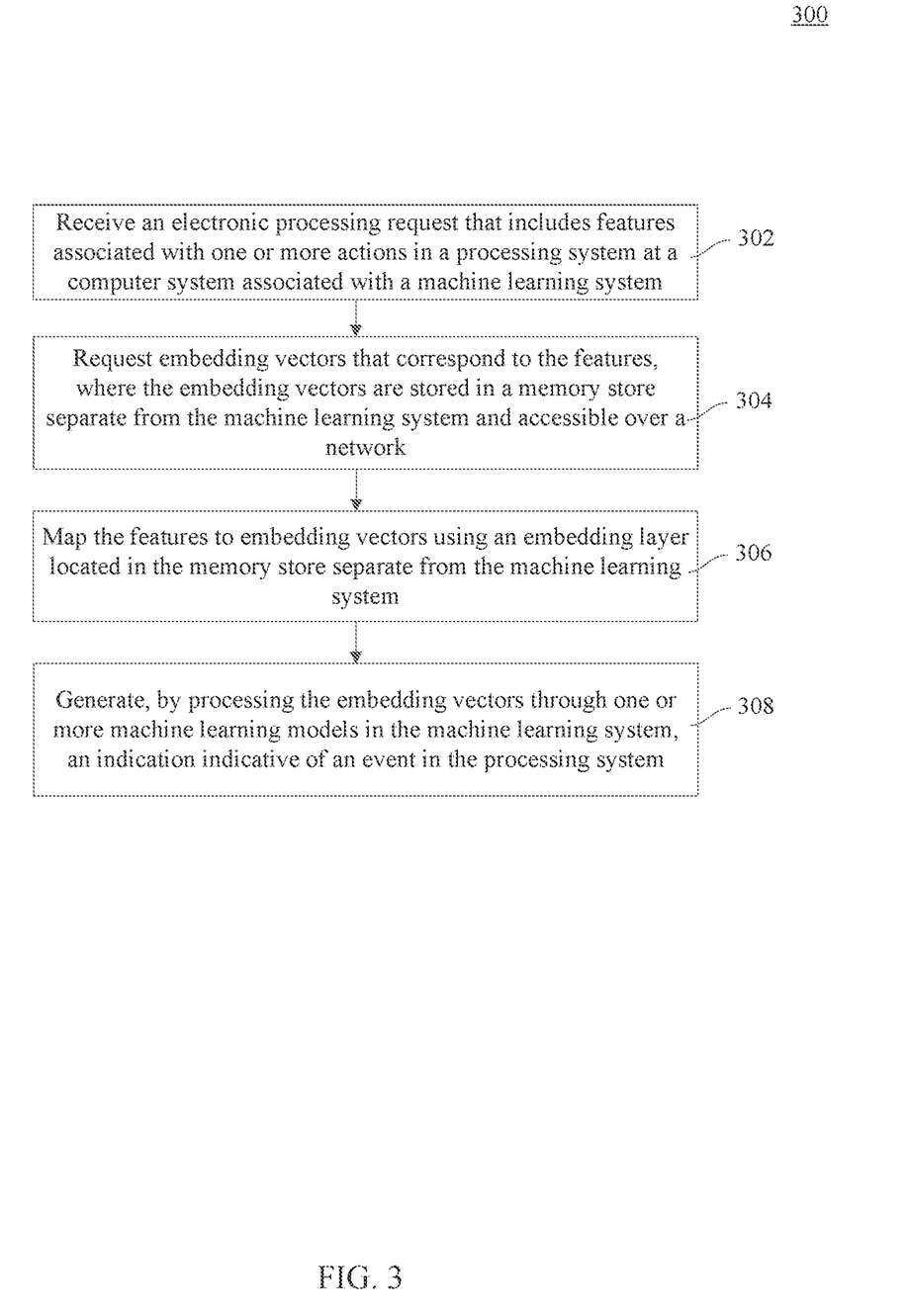
FIG. 3 is a flowchart of a method for identifying a security breach or fraud, according to an embodiment.

FIG. 3 is a flowchart of a method 300 for identifying a security breach or fraud with a machine learning system, according to an embodiment. Method 300 may be performed using hardware and/or software components described in FIGS. 1-2. Note that one or more of the operations may be deleted, combined, or performed in a different order as appropriate. Notably, method 300 may occur multiple times as different actions or events are generated in system 100. In other words, as events occur in the processing system, method 300 may continuously repeat and continuously generate indications that may indicate whether a security breach is occurring in the processing system.

At operation 302, an electronic processing request is received. For example, embedding loader 206 of fraud detection system 118 may receive electronic processing request 212 in response to one or more actions that are performed in system 100. Electronic processing request 212 may include features one or more features 214, such as features 214*a-n*, that may correspond to one or more actions or events performed in the processing system of system 100.

At operation 304, embedding vectors are requested over a network. For example, embedding loader 206 may make a request to memory store 208 that stores embedding layer 210. The request may include feature 214 or features 214*a-n* (or feature identifier(s) and corresponding value(s)). In one embodiment, the request may be a remote network data request that is transmitted over a network to a remote computer system, server, database, etc., that includes memory store 208 that stores embedding layer 210. As discussed above, one or the reasons that memory store 208 stores embedding layer 210 separately from the machine learning models 204 is because the size of the embedding layer 210 may be larger than the available memory space of a computer system that stores the embedding loader 206 and machine learning system 202. In another embodiment, the request may be issued using an API that is shared between embedding loader 206 and memory store 208. The API may be a communication interface that facilitates communications over a network between embedding loader 206 and memory store 208. Either the remote network data request or API may establish a connection between embedding loader 206 and memory store using a variety of available connections, including a remote network data connection, a database connection (e.g., a open database connectivity (ODBC), a Java database connectivity (JDBC), a structured query language (SQL), a database server connection, etc.), a TCP/IP connection, an HTTP connection, a fiber connection, an ethernet connection, a wireless connection (e.g. point-to-point (P2P, T-1, OC3, DSL, cable, fiber, and satellite connections), or the like.

At operation 306, embedding vectors are generated from the features. As discussed in operation 304, embedding loader 206 issues a request for embedding vectors 216a-n to a memory store 208 that is accessible over a network. As discussed above, embedding layer 210 is stored in memory store 208 that is on a separate computer system, computing device, server, physical location, etc., from machine learning system 202 and that may be communicatively connected to machine learning system 202 and/or embedding loader 206 over a network. Once memory store 208 receives the remote network request or API request with feature 214 or features 214a-n, memory store 208 may access the embedding layer 210 and retrieve corresponding embedding vector 216 or embedding vectors 216a-n. Embedding layer 210 may map or transform feature 214 or features 214a-n to corresponding embedding vector 216 or vectors 216a-n, and return embedding vector 216 or embedding vectors 216a-n, using a reverse process discussed in operation 304.

At operation 308, an indication is generated. The indication indicates whether one or more actions associated with features 214a-n are fraudulent or indicative of a breach. For example, machine learning system 202 receives embedding vectors 216a-n, where some or all embedding vectors 216a-n are processed by one or more machine learning models 204. In other words, one or more machine learning models 204 may classify embedding vectors 216a-n into one or more classifications by passing the embedding vectors 216a-n through the one or more machine learning models 204. These classifications may be indications that indicate whether embedding vectors 216a-n correspond to features 214a-n that are indicative to a security breach.

In some embodiments, different embedding vectors 216a-n may be processed by the same or different machine learning models 204. For example, a first and second machine learning model in the machine learning models 204 may receive and process embedding vectors 216a-n, each generating an indication. The two indications may then be combined into a single indication that is an output of machine learning system 202. Alternatively, each indication may individually be an output of machine learning system 202. The indications and embedding vectors 216a-n may correspond to events that occurs when the user logs into the processing system, accesses or selects good or services, performs checkout, withdraws from the processing system or transaction, etc. Alternatively, the first indication may be generated once the user logs-in, and the second indication may be generated when the user attempts to check out or purchase the goods or services.

In another example, a first and second machine learning model in the machine learning models 204 may receive and process an overlapping or nonoverlapping subset of embedding vectors 216a-n, each generating an indication. For example, the first machine learning model may process embedding vectors 216a-d and the second machine learning model may process embedding vectors 216e-n. Alternatively, the first machine learning model may process embedding vectors 216a-f and the second machine learning model may process embedding vectors 216c-n. The two indications may then be combined into a single indication that is an output of machine learning system 202 or be individually an output of machine learning system 202. In a non-limiting embodiment, these indications may be determined when the user selects one or more goods or services.

An example output of machine learning system 202 may be an alert 218. Alert 218 may store an indication or combination of indications that indicate that a fraud, breach or anomaly is occurring in the processing system. In other words, alert 217 may indicate that the one or more actions or events associated with features 214a-n are indicative of a fraud or security breach in system 100.

Figure 4:
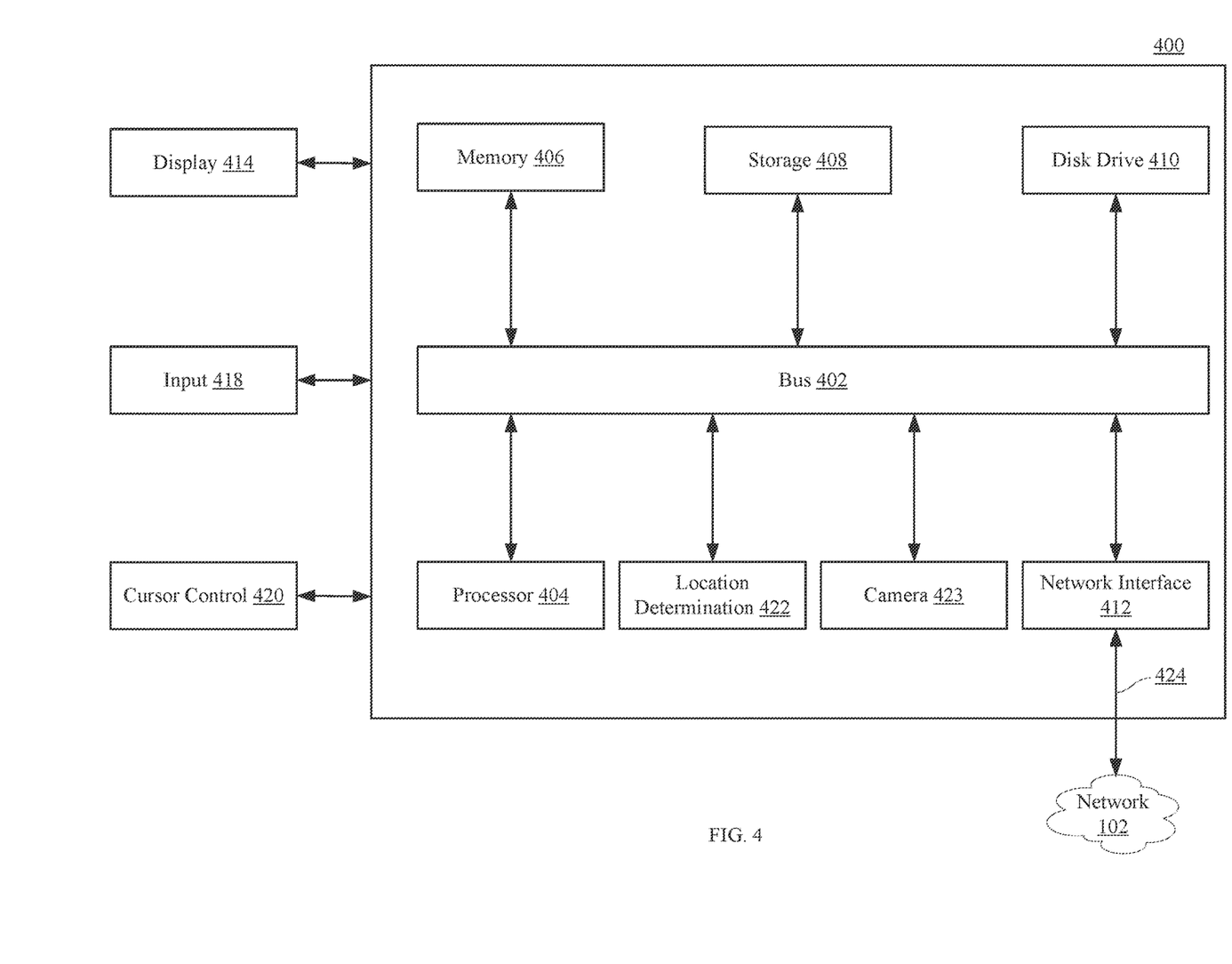
FIG. 4 is a block diagram of a computer system suitable for implementing one or more components or operations in FIGS. 1-3 according to an embodiment.

Referring now to FIG. 4 an embodiment of a computer system 400 suitable for implementing, the systems and methods described in FIGS. 1-3 is illustrated.

In accordance with various embodiments of the disclosure, computer system 400, such as a computer and/or a server, includes a bus 402 or other communication mechanism for communicating information, which interconnects subsystems and components, such as a processing component 404 (e.g., processor, micro-controller, digital signal processor (DSP), graphics processing unit (GPU), etc.), a system memory component 406 (e.g., RAM), a static storage component 408 (e.g., ROM), a disk drive component 410 (e.g., magnetic or optical), a network interface component 412 (e.g., modem or Ethernet card), a display component 414 (e.g., CRT or LCD), an input component 418 (e.g., keyboard, keypad, or virtual keyboard), a cursor control component 420 (e.g., mouse, pointer, or trackball), a location determination component 422 (e.g., a Global Positioning System (GPS) device as illustrated, a cell tower triangulation device, and/or a variety of other location determination devices known in the art), and/or a camera component 423. In one implementation, the disk drive component 410 may comprise a database having one or more disk drive components.

In accordance with embodiments of the disclosure, the computer system 400 performs specific operations by the processor 404 executing one or more sequences of instructions contained in the memory component 406, such as described herein with respect to the mobile communications devices, mobile devices, and/or servers. Such instructions may be read into the system memory component 406 from another computer readable medium, such as the static storage component 408 or the disk drive component 410. In other embodiments, hard-wired circuitry may be used in place of or in combination with software instructions to implement the disclosure.

Logic may be encoded in a computer readable medium, which may refer to any medium that participates in providing instructions to the processor 404 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 410, volatile media includes dynamic memory, such as the system memory component 406, and transmission media includes coaxial cables, copper wire, and fiber optics, including wires that comprise the bus 402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 400. In various other embodiments of the disclosure, a plurality of the computer systems 400 coupled by a communication link 424 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 400 may transmit and receive messages, data, information and instructions, including one or more programs (i.e., application code) through the communication link 424 and the network interface component 412. The network interface component 412 may include an antenna, either separate or integrated, to enable transmission and reception via the communication link 424. Received program code may be executed by processor 404 as received and/or stored in disk drive component 410 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A method, comprising:
    receiving, at a first computer system having a machine learning system configured to execute at least one machine learning model, an electronic processing request having a plurality of features and corresponding to at least one action in a processing system;
    using a network interface device of the first computer system, making a remote network call via an embedding loader to a second, separate computer system to access an embedding layer of the at least one machine learning model, wherein the second, separate computer system also has a separate memory storage, contents of which are not accessible by the first computer system having the machine learning system except via a network connection and the embedding layer is located in the memory storage of the second computer system;
    receiving, at the first computer system having the machine learning system and from the embedding layer of the second computer system, a plurality of embedding vectors associated with the plurality of features, wherein the embedding layer is configured to map a feature in the plurality of features to an embedding vector in the plurality of the embedding vectors; and
    generating, by processing the plurality of embedding vectors by the at least one machine learning model in the machine learning system, an indication indicating whether the at least one action is associated with a security breach in the processing system.

2. The method of claim 1, wherein the memory storage that stores the embedding layer in the second computer system is located on a separate device from the first computer system that stores the machine learning system.

3. The method of claim 1, wherein a memory storage that stores the embedding layer is a non-volatile memory that is larger than a random-access memory that stores the machine learning system.

4. The method of claim 1, wherein the machine learning system includes a first machine learning model configured to process a first subset of embedding vectors from the plurality of embedding vectors and a second machine learning model configured to process a second subset of embedding vectors from the plurality of embedding vectors, wherein the second subset of embedding vectors is received at a different time than the first subset of embedding vectors; and
    wherein the generating further comprises:
        generating, by processing the first subset of embedding vectors by the first machine learning model, a first indication; and
        generating, using the second machine learning model, a second indication from the second machine learning model, and
        wherein the indication indicating whether the at least one action is associated with the security breach is a combination of the first indication and the second indication.

5. The method of claim 1, wherein the machine learning system includes a first machine learning model and a second machine learning model configured to process the embedding vector from the plurality of embedding vectors; and
    wherein the generating further comprises:
        generating, using the first machine learning model, a first indication using the embedding vector in the plurality of embedding vectors; and
        generating, using the second machine learning model, a second indication using the embedding vector in the plurality of embedding vectors,
    wherein the indication is a combination of the first indication and the second indication.

6. The method of claim 1, wherein a portion of features in the plurality of features are associated with actions in the at least one action that are generated based on events that occur in the processing system.

7. The method of claim 6, wherein a portion of embeddings in the plurality of embedding vectors are continuously retrieved based on the portion of features; and
    wherein the generating continuously updates the indication by processing the portion of embeddings through the at least one machine learning model.

8. The method of claim 1, wherein the at least one machine learning model in the machine learning system is an event driven machine learning model configured to process the plurality of embedding vectors associated with the plurality of features, wherein features in the plurality of features are generated in real-time by actions in the at least one action that occur in response to a user interaction with the processing system.

9. The method of claim 1, further comprising:
refreshing the embedding layer with mappings between at least one new feature and at least one new embedding vector without retraining the at least one machine learning model in the machine learning system that generates the indication using the at least one new embedding vector.

10. The method of claim 1, further comprising:
generating a first indication in response to a first action in the at least one action and a second indication in response to a second action in the at least one action that occurs subsequent to the first action; and
combining the first indication and the second indication to generate the indication indicating whether the first action and the second action are associated with the security breach in the processing system.

11. A system, comprising:
a first computer system having a machine learning system configured to execute at least one machine learning model and further configured to:
receive an electronic processing request having a plurality of features and corresponding to at least one action in a processing system;
using a network interface device of the first computer system, make a remote network call via an embedding loader to a second, separate computer system to access an embedding layer of the at least one machine learning model, wherein the second, separate computer system also has a separate memory storage, contents of which are not accessible by the first computer system having the machine learning system except via a network connection and the embedding layer is located in the memory storage of the second computer system;
receive from the embedding layer of the second computer system, a plurality of embedding vectors associated with the plurality of features, wherein the embedding layer is configured to map a feature in the plurality of features to an embedding vector in the plurality of the embedding vectors; and
generate, by processing the plurality of embedding vectors by the at least one machine learning model in the machine learning system, an indication indicating whether the at least one action is associated with a security breach in the processing system.

12. The system of claim 11, wherein the memory storage that stores the embedding layer in the second computer system is located on a separate device from the first computer system that stores the machine learning system.

13. The system of claim 11, wherein a memory storage that stores the embedding layer is a non-volatile memory that is larger than a random-access memory that stores the machine learning system.

14. The system of claim 11, wherein the machine learning system includes a first machine learning model configured to process a first subset of embedding vectors from the plurality of embedding vectors and a second machine learning model configured to process a second subset of embedding vectors from the plurality of embedding vectors, wherein the second subset of embedding vectors is received at a different time than the first subset of embedding vectors; and
wherein to generate the indication, the first computer system is further configured to:
generate, by processing the first subset of embedding vectors by the first machine learning model, a first indication; and
generate, using the second machine learning model, a second indication from the second machine learning model, and
wherein the indication indicating whether the at least one action is associated with the security breach is a combination of the first indication and the second indication.

15. The system of claim 11, wherein the machine learning system includes a first machine learning model and a second machine learning model configured to process the embedding vector from the plurality of embedding vectors; and
wherein to generate the indication, the first computer system is further configured to:
generate, using the first machine learning model, a first indication using the embedding vector in the plurality of embedding vectors; and
generate, using the second machine learning model, a second indication using the embedding vector in the plurality of embedding vectors, and
wherein the indication is a combination of the first indication and the second indication.

16. The system of claim 11, wherein a portion of features in the plurality of features are associated with actions in the at least one action that are generated based on events that occur in the processing system.

17. The system of claim 16, wherein a portion of embeddings in the plurality of embedding vectors are continuously retrieved based on the portion of features; and
wherein to generate the indication, the first computer system is further configured to continuously update the indication by processing the portion of embeddings through the at least one machine learning model.

18. The system of claim 11, wherein the at least one machine learning model in the machine learning system is an event driven machine learning model configured to process the plurality of embedding vectors associated with the plurality of features, wherein features in the plurality of features are generated in real-time by actions in the at least one action that occur in response to a user interaction with the processing system.

19. The system of claim 11, wherein the first computer system is further configured to:
refresh the embedding layer with mappings between at least one new feature and at least one new embedding vector without retraining the at least one machine learning model in the machine learning system that generates the indication using the at least one new embedding vector.

20. A non-transitory machine-readable medium having stored thereon machine-readable instructions executable to cause machines to perform operations, the operations comprising:
receiving, at a first computer system having a machine learning system configured to execute at least one machine learning model, an electronic processing request having a plurality of features and corresponding to at least one action in a processing system;
using a network interface device of the first computer system, making a remote network call via an embedding loader to a second, separate computer system to access an embedding layer of the at least one machine learning model, wherein the second, separate computer system also has a separate memory storage, contents of which are not accessible by the first computer system having the machine learning system except via a network connection and the embedding layer is located in the memory storage of the second computer system;

receiving, at the first computer system having the machine learning system and from the embedding layer of the second computer system, a plurality of embedding vectors associated with the plurality of features, wherein the embedding layer is configured to map a feature in the plurality of features to an embedding vector in the plurality of the embedding vectors; and generating, by processing the plurality of embedding vectors by the at least one machine learning model in the machine learning system, an indication indicating whether the at least one action is associated with a security breach in the processing system.

* * * * *